US006782655B2

(12) United States Patent
Hoshall

(10) Patent No.: US 6,782,655 B2
(45) Date of Patent: Aug. 31, 2004

(54) SUBSURFACE PESTICIDE INJECTION AND FLUID EXTRACTION SYSTEM

(76) Inventor: Tom Hoshall, 7150 NW. 112th St., Oklahoma City, OK (US) 73162

( * ) Notice: Subject to any disclaimer, the term of this patent is extended or adjusted under 35 U.S.C. 154(b) by 0 days.

(21) Appl. No.: 10/440,715

(22) Filed: May 19, 2003

(65) Prior Publication Data

US 2003/0192230 A1 Oct. 16, 2003

Related U.S. Application Data

(63) Continuation of application No. 10/209,566, filed on Jul. 30, 2002, now Pat. No. 6,564,504, which is a continuation of application No. 09/594,952, filed on Jun. 15, 2000, now Pat. No. 6,446,383, which is a continuation-in-part of application No. 09/109,653, filed on Jul. 2, 1998, now abandoned.

(51) Int. Cl.[7] ............................................... A01M 1/20
(52) U.S. Cl. ........................... 43/132.1; 43/124; 52/101
(58) Field of Search ............................. 43/124, 132.1; 52/101, 169.1, 169.5; 239/547; 138/28, 118, 118.1, 119, 178

(56) References Cited

U.S. PATENT DOCUMENTS

| 2,059,095 A | 10/1936 | Fellman | 43/124 |
|---|---|---|---|
| 2,246,731 A | 6/1941 | Hill | 43/124 |
| 2,592,022 A | 4/1952 | Gallant | 43/131 |
| 2,842,892 A | 7/1958 | Aldridge et al. | 43/124 |
| 2,915,848 A | 12/1959 | Griffin | 43/124 |
| 2,981,025 A | 4/1961 | Woodson | 43/124 |
| RE25,080 E | 11/1961 | Griffin | 43/124 |
| 3,124,893 A | 3/1964 | Glenn | 43/124 |
| 3,151,746 A | 10/1964 | Reustle et al. | 43/124 |
| 3,209,485 A | 10/1965 | Griffin | 43/124 |
| 3,513,586 A | 5/1970 | Meyer et al. | 43/124 |
| 3,676,949 A | 7/1972 | Ramsey | 43/124 |
| 3,782,026 A | 1/1974 | Bridges et al. | 43/124 |
| 3,909,975 A | 10/1975 | Basile | 43/124 |
| 3,980,104 A | 9/1976 | Kabai | 239/547 |
| 4,003,408 A | 1/1977 | Turner | 138/118 |
| 4,016,727 A | 4/1977 | Osaka et al. | 138/178 |
| 4,028,841 A | 6/1977 | Lundwall | 43/124 |
| 4,077,571 A | 3/1978 | Harmony | 239/547 |
| 4,095,750 A | 6/1978 | Gilead | 239/547 |
| 4,139,159 A | 2/1979 | Inoue et al. | 239/547 |
| 4,181,051 A | 1/1980 | Drori | 239/547 |
| 4,254,916 A | 3/1981 | Havens et al. | 239/547 |
| 4,297,055 A | 10/1981 | Peacock | 43/124 |

(List continued on next page.)

Primary Examiner—Darren W. Ark
(74) Attorney, Agent, or Firm—Dunlap Codding & Rogers

(57) ABSTRACT

A subsurface pesticide injection system for use in combination with a structure having a footing formed in a base soil, a stem wall formed on the footing and defining a perimeter of the structure, a fill material disposed on the base soil within the perimeter of the stem wall, and a concrete slab formed on the fill material is provided. The concrete slab has openings extending therethrough. The subsurface pesticide injection and fluid extraction system comprising includes a tubular conduit disposed adjacent the foundation of the structure. The tubular conduit has a sidewall and a plurality of tortuous pores extending through the sidewall of the tubular conduit. A connector member is attached to one of the first and second ends of the tubular conduit and detachably connectable to a source of pressurized pesticide such that pesticide may be selectively injected into the fill material in an injection mode to form a chemical barrier against the infestation of pests into the structure through the openings of the concrete slab.

4 Claims, 6 Drawing Sheets

U.S. PATENT DOCUMENTS

| | | | | |
|---|---|---|---|---|
| 4,517,316 | A | 5/1985 | Mason | 521/81 |
| 4,615,642 | A | 10/1986 | Mason | 405/45 |
| 4,625,474 | A | 12/1986 | Peacock, deceased et al. | 43/124 |
| 4,726,520 | A | 2/1988 | Brown et al. | 239/547 |
| 4,742,641 | A | 5/1988 | Cretti | 43/132.1 |
| 4,798,034 | A | 1/1989 | Jarnagin et al. | 52/169.5 |
| 4,800,672 | A | 1/1989 | Jackson | 43/125 |
| 4,823,505 | A | 4/1989 | Jackson | 43/124 |
| 4,858,521 | A | 8/1989 | Heh | 454/344 |
| 4,885,984 | A | 12/1989 | Franceus | 454/341 |
| 4,893,434 | A | 1/1990 | Knipp et al. | 43/124 |
| 4,938,124 | A | 7/1990 | Garza | 454/343 |
| 4,944,110 | A | 7/1990 | Sims | 43/124 |
| 4,945,673 | A | 8/1990 | Lavelle | 43/124 |
| 4,949,626 | A | 8/1990 | Townsend et al. | 52/169.5 |
| 4,988,237 | A | 1/1991 | Crawshaw | 52/169.5 |
| 4,995,309 | A | 2/1991 | Weaver | 98/42.07 |
| 5,003,750 | A | 4/1991 | Delgado | 52/169.5 |
| 5,007,197 | A | 4/1991 | Barbett | 43/124 |
| 5,058,312 | A | 10/1991 | Aki et al. | 43/125 |
| 5,063,706 | A | 11/1991 | Aki et al. | 43/125 |
| 5,083,500 | A | 1/1992 | Francis et al. | 52/169.5 |
| 5,101,712 | A | 4/1992 | Dean, Jr. | 52/169.5 |
| 5,127,768 | A | 7/1992 | Crawshaw et al. | 405/229 |
| 5,184,418 | A | 2/1993 | Fletscher | 43/124 |
| 5,231,796 | A | 8/1993 | Sims | 43/124 |
| 5,277,003 | A | 1/1994 | Myers | 52/169.5 |
| 5,309,669 | A | 5/1994 | Jackson | 43/124 |
| 5,317,831 | A | 6/1994 | Fletscher | 43/124 |
| 5,347,749 | A | 9/1994 | Chitwood et al. | 43/124 |
| 5,356,240 | A | 10/1994 | Schuler | 405/229 |
| 5,359,806 | A | 11/1994 | Jeffery et al. | 43/131 |
| 5,361,533 | A | 11/1994 | Pepper | 43/124 |
| 5,378,086 | A | 1/1995 | Campbell, Jr. et al. | 43/124 |
| 5,390,440 | A | 2/1995 | Mihealsick | 43/124 |
| 5,394,642 | A | 3/1995 | Takaoka | 43/124 |
| 5,474,398 | A | 12/1995 | Prassas et al. | 405/45 |
| 5,502,920 | A | 4/1996 | Takaoka | 43/132.1 |
| 5,551,797 | A | 9/1996 | Sanford | 52/169.5 |
| 5,620,143 | A | 4/1997 | Delmer et al. | 239/547 |
| 5,689,921 | A | 11/1997 | Carlton | 52/169.5 |
| 5,694,723 | A | 12/1997 | Parker | 52/169.5 |
| 5,740,638 | A | 4/1998 | Shepherd, III | 52/169.5 |
| 5,771,643 | A | 6/1998 | Parker | 52/169.5 |
| 5,775,840 | A | 7/1998 | Knieper et al. | 405/128 |
| 5,819,466 | A | 10/1998 | Aesch et al. | 43/123 |
| 5,836,815 | A | 11/1998 | Jennemann | 52/169.5 |
| 5,852,906 | A | 12/1998 | Kuban | 52/169.5 |
| 5,881,494 | A | 3/1999 | Jenkins | 43/124 |
| 5,931,603 | A | 8/1999 | Swain et al. | 52/169.5 |
| 5,960,584 | A | 10/1999 | Aesch, Jr. | 43/124 |
| 6,047,498 | A | 4/2000 | Mann | 43/132.1 |
| 6,070,357 | A | 6/2000 | Hartill et al. | 43/132.1 |
| 6,199,770 | B1 | 3/2001 | King et al. | 43/124 |
| 6,279,275 | B1 | 8/2001 | Sawyer | 52/169.5 |
| 6,397,518 | B2 | 6/2002 | Mann | 43/132.1 |
| 6,446,383 | B1 | 9/2002 | Hoshall | 43/124 |
| 6,463,694 | B1 * | 10/2002 | Manciet | 43/132.1 |

* cited by examiner

SUBSURFACE PESTICIDE INJECTION AND FLUID EXTRACTION SYSTEM

CROSS REFERENCE TO RELATED APPLICATIONS

This application is a continuation of U.S. Ser. No. 10/209,566, filed Jul. 30, 2002, now U.S. Pat. No. 6,564,504 which is a continuation of U.S. Ser. No. 09/594,952, filed Jun. 15, 2000, now U.S. Pat. No. 6,446,383, which is a continuation-in-part of U.S. Ser. No. 09/109,653, filed Jul. 2, 1998, now abandoned, the content of each hereby expressly incorporated herein by reference.

BACKGROUND OF THE INVENTION

1. Field of the Invention

The present invention relates generally to insect control systems and vapor exhaust systems for structures, and more particularly, but not by way of limitation, to an improved system for both selectively injecting pesticide beneath a structure and extracting fluids, such as water and harmful vapors from beneath the structure.

2. Brief Description of the Related Art

Numerous systems have been proposed for protecting buildings and homes from damage caused by pests, such as subterranean termites, which can do considerable structural and cosmetic damage over time. A common practice for treating infestation of pests into a structure is to pretreat the ground under the structure with pesticide chemicals during the construction process. This is done by applying a substantial quantity of pesticides, such as termiticide, on the ground under the proposed structure before the slab is poured in an attempt to create a chemical barrier that will keep the insects from entering the structure.

The problem with this method of treatment is the amount of pesticide required to be used can be harmful to occupants of the structure as well as harmful to the ground water. Furthermore, even though a large amount of pesticide is applied to the ground, the resulting chemical barrier nevertheless becomes ineffective over time as the chemicals break down.

With these problems in mind, other methods have been developed for the periodic injection of pesticide beneath structures. One particular method involves the drilling of holes in and around the slab for the injection of pesticide. This method has many drawbacks which include affecting the integrity of the slab, the mess of drilling through the slab, convenience of having to clear a path around the structure to permit access for the drilling, the need for the holes to be plugged, and the residual odor of the pesticide that escapes during the injection process. In addition, this process must be periodically repeated during the lifetime of the structure.

Considerable efforts have been made to alleviate the problems of post construction periodic injection of pesticides beneath the structure by placing a injection system beneath the structure during the construction process. Many of these systems involve placing a network of porous tubing beneath the structure. The problem encountered in these systems however is that the holes provided in the tubing have a fixed diameter and thus are susceptible to clogging. That is, because the preference to place the network of tubing within the fill material positioned under the slab, the fill material often obstructs or clogs the holes. The holes can also get clogged by dead insects and other pests that may enter the holes in the tubing over the course of the lifetime of the system. When the holes become clogged or obstructed, they fail to deliver pesticide to the surrounding location, thereby creating a gap in the chemical barrier which can be exploited by pests.

Other injection network systems with fixed holes have attempted to prevent hole obstruction elaborate systems or by varying construction procedures. For example, systems have been developed where the holes are sheltered with wick-like membranes, soil screens, shower-type sprinkler heads, and sponges. Other systems attempt to keep the holes from being obstructed by surrounding the holes with specialized fill materials applied during the construction process. Each of these types of systems is complex and increases installation costs.

Another problem of concern in many regions of the country is accumulation of moisture and/or harmful gases, such as radon, beneath homes and other structures. The accumulation of water beneath a floor slab can be a substantial problem, particularly where the water table is high or rainfall is plentiful. The accumulation of water beneath the slab of a structure can result in the seepage of water through the foundation and into the structure. In addition, the water is a breeding ground for microorganisms, such as mold and mildew, and may also cause the foundation to erode.

Radon is produced by the gradual decay of solid radioactive elements in the soil. While geographic regions that contain large concentrations of solid radioactive elements in the soil, the mere release of the gas even in these areas is not a concern in that the uninterrupted movement of radon into the atmosphere is generally at such a slow rate that little or no health hazard is posed.

The concern has risen in recent years due to the discovery of large concentrations of radon gas that had accumulated in dwellings. It became apparent that it was not the rate at which radon gas was given off by the soil, but the failure of dwellings to allow radon and other contaminants to continue on into the atmosphere. This has been caused by the effort of builders to make homes more energy efficient by thermally sealing the structures as tight as possible.

One factor in the degree of gas accumulation is the construction of the building itself and more specifically the construction of the support system in contact with the ground. That is, more and more homes are being built upon what is called a slab foundation. The effect of this type of foundation is to act as a cap to contain gases from the soil, allowing them to escape only when they find their way up into the house by the way of the cracks and plumbing openings formed in the slab.

Numerous subsurface ventilation systems have been proposed. However, like the prior art pesticide systems discussed above, these ventilation systems are susceptible to clogging, are relatively complex, and expensive to install. In addition, the prior art ventilation systems are not adapted to serve a dual purpose of periodically delivering pesticides beneath the structure.

To this end, a need exists for a subsurface pesticide injection and fluid extraction system which is simple in design, inexpensive to install, and easy to operate and maintain. It is to such a system that the present invention is directed.

DETAILED DESCRIPTION OF THE INVENTION

Figure 1:
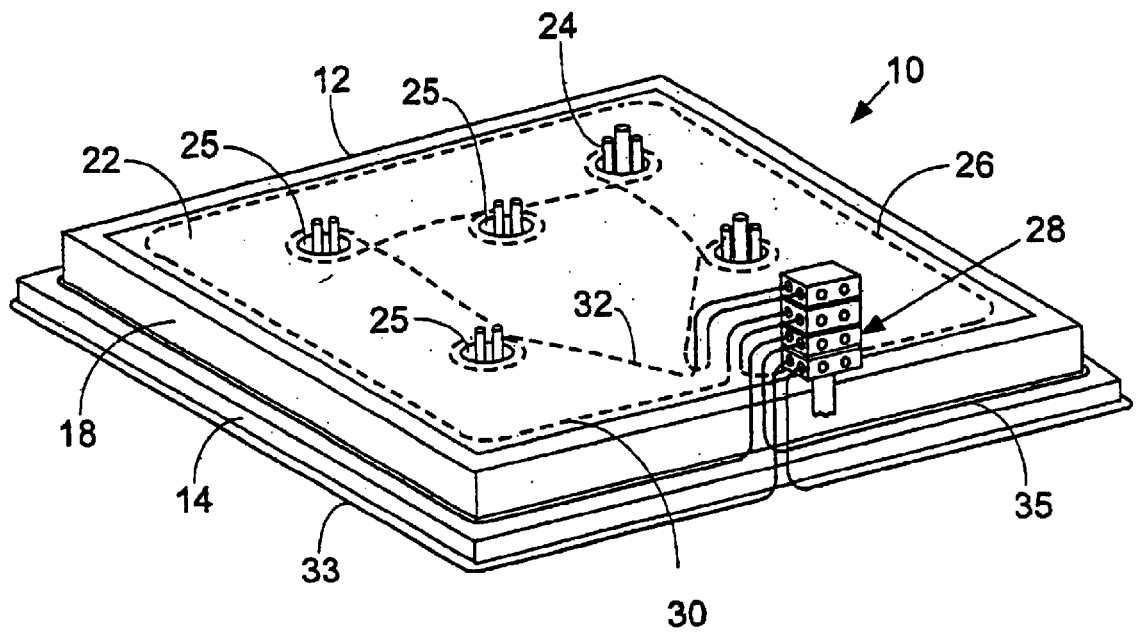
FIG. 1 is a perspective view of a foundation of a dwelling with a subsurface pesticide injection and fluid extraction system constructed in accordance with the present invention installed under the foundation.
Figure 2:
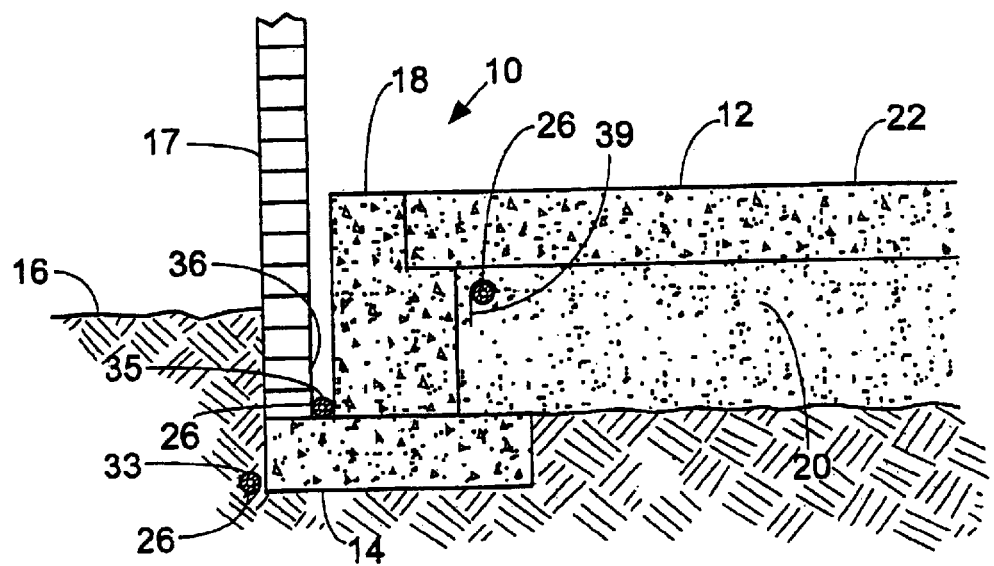
FIG. 2 is a cross-sectional view of a portion of the foundation illustrating the subsurface pesticide injection and fluid extraction system of FIG. 1 installed under the foundation.

Referring now to the drawings and more particularly to FIGS. 1 and 2, a subsurface pesticide injection and fluid extraction system 10 constructed in accordance with the present invention is shown installed beneath a foundation 12 of a structure. The foundation 12 has a footing 14 formed in a base soil 16 (FIG. 2). The footing 14 provides a support surface for a brick exterior 17 (FIG. 2) and a stem wall 18 which generally defines a perimeter of the structure. A fill material 20, such as sand or gravel, is disposed on the base soil 16 within the perimeter of the stem wall 18, and a concrete slab 22 is formed on the fill material 20. A plurality of plumbing pipes 24, which run through the fill material 20, protrude up through the concrete slab 22.

Upon curing of the concrete slab 22, openings or cracks typically form between the stem wall 18 and concrete slab 22, as well as between the plumbing pipes 24 and the concrete slab 22, such as openings 25. These openings and cracks provide an entry point into the structure for pests and fluids, including water and vapors, such as radon gas. Consequently, the area near the perimeter of the concrete slab 22 and the area adjacent where the plumbing pipes 24 protrude up through the concrete slab 22 require periodic attention to prevent pest infestation and accumulation of harmful fluids in the structure.

The subsurface pesticide injection and fluid extraction system 10 includes one or more circuits of tubular conduit 26 positioned under the foundation of the structure and a connector assembly 28 which permits a source of pressurized pesticide to be connected to the tubular conduits. As such, pesticide may be selectively injected into the fill material in an injection mode to form a chemical barrier against the infestation of pests into the structure through the openings of the concrete slab. In addition, a vacuum source may be connected to the tubular conduits so that fluids may be selectively extracted from the fill material in an extraction mode to reduce the passage of fluids into the structure through the openings of the concrete slab.

FIGS. 1 and 2 illustrate the subsurface pesticide injection and fluid extraction system 10 having a circuit 30 which is positioned adjacent to the perimeter of the concrete slab 22 and a circuit 32 which is positioned to loop in close proximity to the upward extending plumbing pipes 24. The system 10 is also illustrated having a circuit 33 extending around the perimeter of the structure on the exterior side of the footing 14 and a circuit 35 positioned in a space 36 formed between the brick exterior 17 and the stem wall 18. While the circuits 33 and 35 can be utilized to deliver pesticide and extract fluids in a manner to be discussed below, the circuits 33 and 35 are primarily provided for delivering pesticide.

As illustrated in FIG. 2, the tubular conduit 26 of the circuit 30 can be secured in the fill material 20 with a hook 39 to prevent the tubular conduit 26 from floating into the concrete slab 22 when the concrete slab 22 is being poured.

Figure 3:
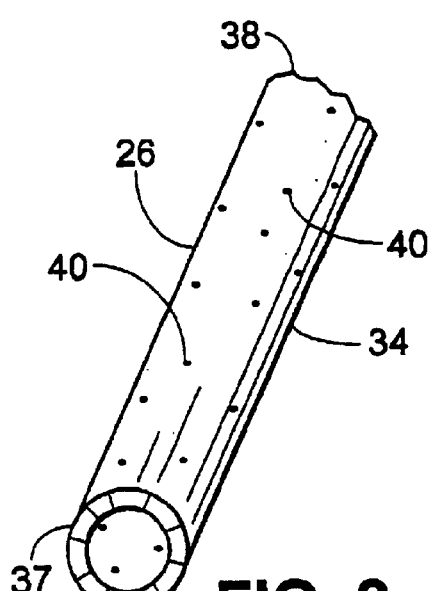
FIG. 3 is a perspective view of an elastomeric conduit used with the subsurface pesticide injection and fluid extraction system of the present invention.
Figure 4:
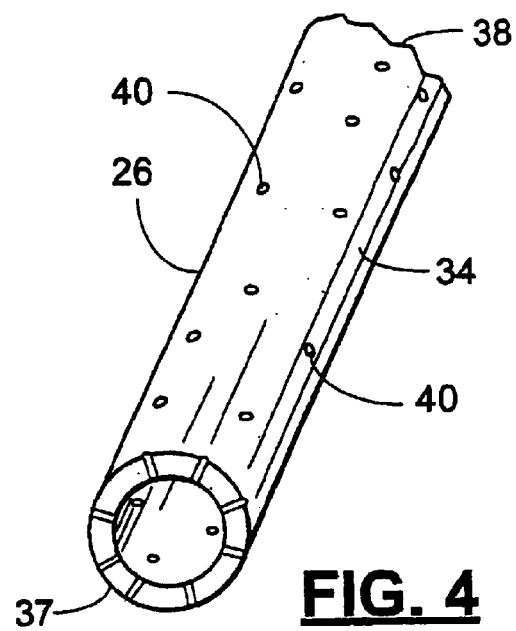
FIG. 4 is a perspective view of the elastomeric conduit of FIG. 3 shown in an expanded condition for releasing fluid in accordance with the present invention.
Figure 4A:
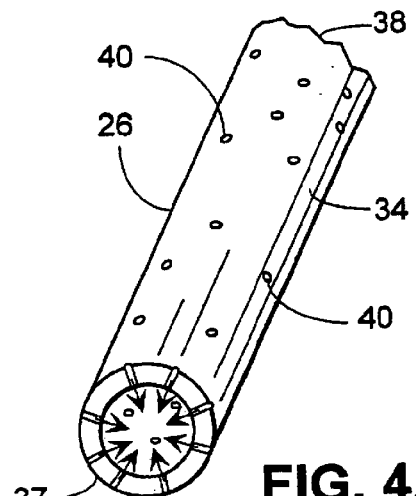
FIG. 4A is a perspective view of the elastomeric conduit of FIG. 3 shown in a contracted condition for drawing fluid in accordance with the present invention.

Referring now FIGS. 3, 4 and 4A, the porous conduit 26 is generally tubular and has a sidewall 34, a first end 37, a second end 38, and a plurality of pores 40 extending through the sidewall 34 from the first end 37 to the second end 38. The tubular conduit 26 has a substantially circular cross-sectional configuration and is constructed of an elastomeric material, such as rubber, neoprene, or plastic. As a result, upon applying a positive internal pressure to the tubular conduit 26, the sidewall 34 expands slightly thereby causing the pores 40 of the tubular conduit 26 to open (FIG. 4) and permit the release of fluid from the tubular conduit 26 into the fill material 20 in an injection mode. Upon applying a negative internal pressure to the internal conduit 26, the sidewall 34 collapses slightly thereby causing the pores of the tubular conduit 26 to open inwardly (FIG. 4A) and permit the drawing of fluid from the fill material 20 into the tubular conduit 26 in an extraction mode. Finally, upon removal of the positive and negative and internal pressures from the tubular conduit 26, the pores 40 are caused to close (FIG. 3) so that the pores 40 remain substantially clog free while the tubular conduit 26 maintains a substantially circular cross-sectional configuration under the load of the fill material 20.

Figure 5:
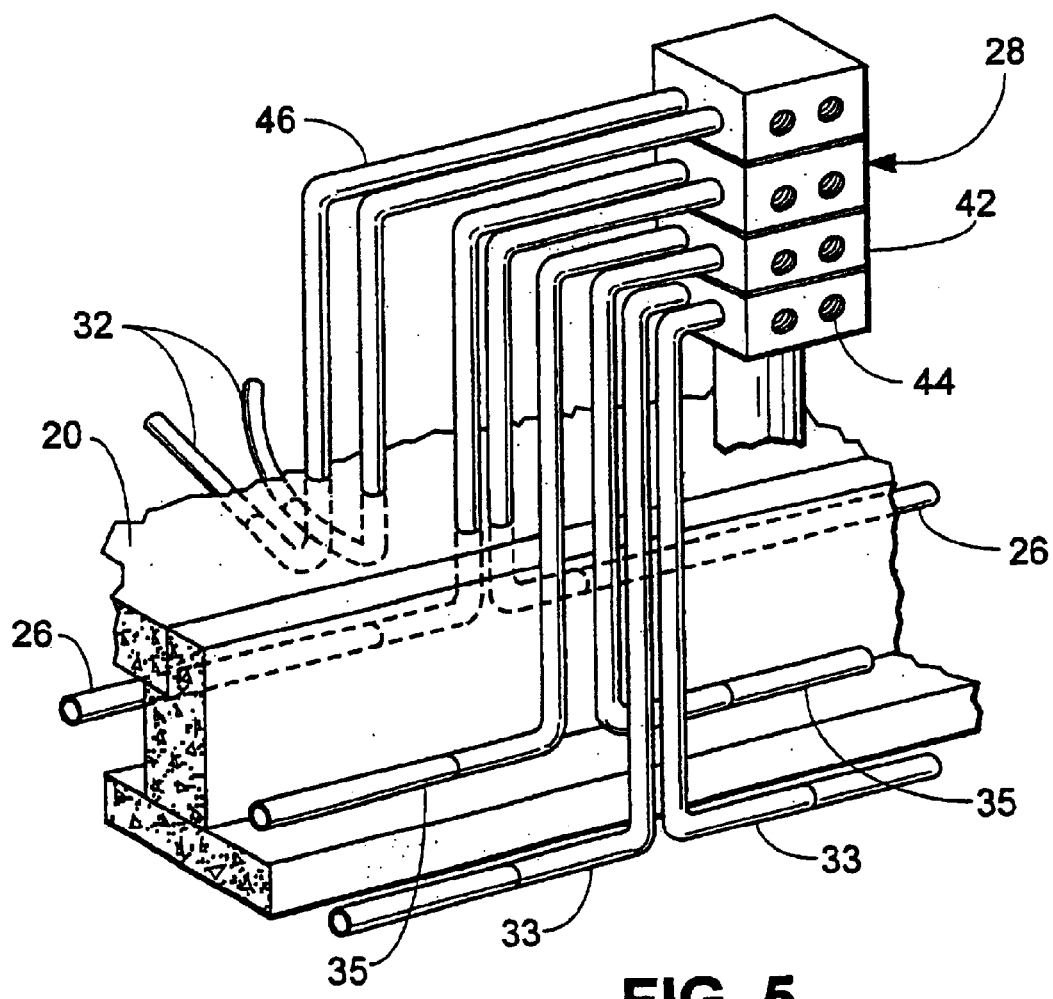
FIG. 5 is a partially cutaway, perspective view of a service panel of the subsurface pesticide injection and fluid extraction system of the present invention.

As illustrated in FIG. 5, the connector assembly 28 includes an access box 42 having a plurality of access ports or female connector members 44 (only one of the access ports being designated in FIG. 5) and a plurality of nonporous tubular conduits 46 (only one of the nonporous tubular conduits being designated in FIG. 5) for establishing fluid communication between the access ports 44 and the porous conduits 26. The nonporous tubular conduits 46 are preferably constructed of a relatively flexible material, such as polyethylene. The access box 42 includes an access port 44 for each end of the tubular conduit 26 for each circuit 30, 32, and 33, and 35. Each nonporous tubular conduit 46 is disposed in one end of a corresponding porous tubular conduit 26 and the porous tubular conduit 26 is secured thereto with a suitable device, such as a hose clamp (not shown).

Each access port 44 is adapted to receive a source of pressurized pesticide whereby the pesticide may be selectively injected into the fill material 20 in a injection mode via the porous conduits 26 to form a chemical barrier against the infestation of pests into the structure through the openings 25 of the concrete slab 22. A source of pressurized pesticide may be attached to each of the access ports 44 or to only one of the access ports 44. If the source of pressurized pesticide is connected to only one of the access ports 44, the other access port 44 is plugged with a cap (not shown).

In a like manner, each access port 44 is also adapted to be detachably connected to a vacuum source whereby fluids may be selectively extracted from the fill material 20 in an extraction mode to reduce the passage of fluids into the structure through the openings 25 of the concrete slab 22.

The access ports 44 are illustrated as being configured for threaded attachment with the source of pressurized pesticide and the vacuum source. The access box 42 can be located in any convenient location such as on a wall of a garage, in a utility closet, or on an exterior wall of the structure.

Figure 6:
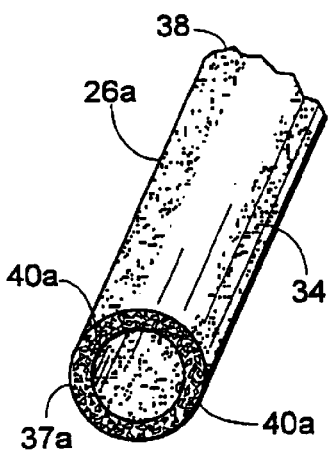
FIG. 6A is a perspective view of the tubular conduit of FIG. 6 shown in an expanded condition for injecting fluid in accordance with the present invention.
Figure 6A:
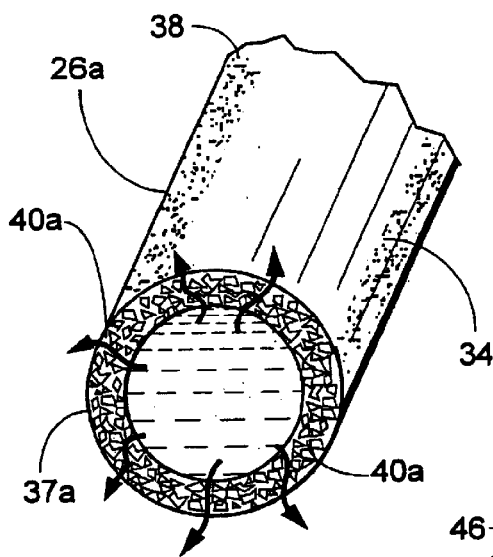

FIGS. 6 and 6A illustrate another embodiment of a tubular conduit 26a which can be used in the system 10 of the present invention for injecting pesticide into the fill material 20 and the base soil 16 and for extracting fluids from the fill material 20. The tubular conduit 26a is formed of particles of vulcanized rubber dispersed in a binder resin such that tortuous pores or channels are formed in the side wall. Examples of suitable conduits are disclosed in U.S. Pat. No. 4,003,408, assigned to George C. Ballas, trustee, and U.S. Pat. No. 5,474,398, assigned to Aquapore Moisture Systems, Inc. of Phoenix, Ariz., both of which are hereby expressly incorporated herein.

Like the tubular conduit 26, the tubular conduit 26a is generally tubular and has a side wall 34a, a first end 37a, a second end 38a, and a plurality of small tortuous pores or channels 40a extending through the side wall 34a. Further, the sidewall 34a has a thickness sufficient to give the tubular conduit 26a structural integrity to prevent collapse of the tubular conduit 26a due to soil loading pressures. The sidewall 34a is also of such thickness so that the tubular conduit 26a maintains a high degree of flexibility along it length to facilitate installation.

The tubular conduit 26a has a substantially circular cross-sectional configuration and is constructed of an elastomeric material such that upon applying a positive internal pressure to the tubular conduit 26a by the injection of the pressurized pesticide into the tubular conduit 26a, the sidewall 34a expands slightly causing the tortuous pores 40a of the tubular conduit 26a to open and permit pesticide to drip through the tortuous pores 40a into the fill material 20 in the injection mode while the tubular conduit 26a maintains its substantially circular cross-sectional configuration. Upon applying a negative internal pressure to the tubular conduit 26a, the sidewall 34a is caused to collapse slightly causing the tortuous pores 40a of the tubular conduit 26a to open inwardly and permit fluids to be drawn through the tortuous pores 40a from the fill material 20 into the tubular conduit 26a in the extraction mode while the tortuous pores 40a remain substantially clog free and the tubular conduit 26a maintains its substantially circular cross-sectional configuration. Finally, upon removal of the positive and negative internal pressures the tortuous pores 40a are caused to close so that the tortuous pores 40a remain substantially clog free while the tubular conduit 26a maintains its substantially circular cross-sectional configuration.

Figure 7:
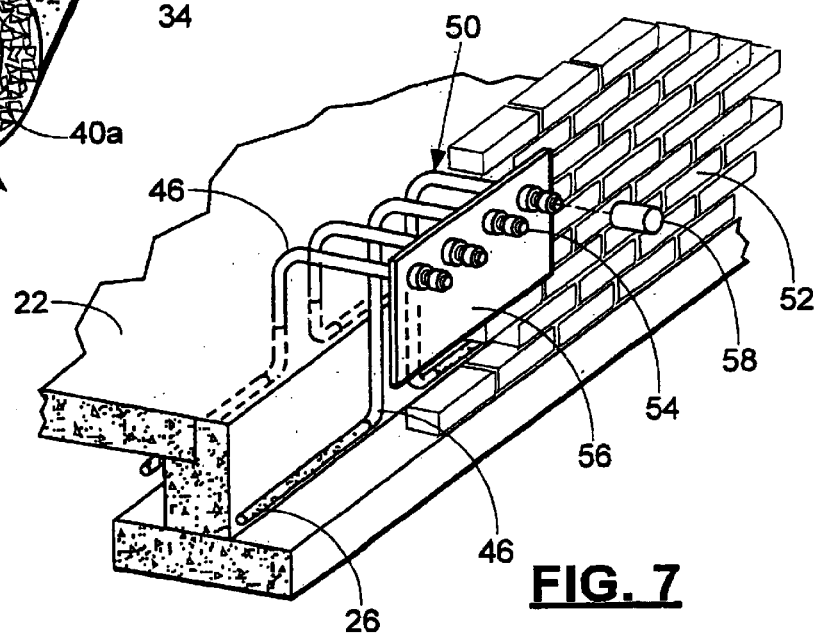
FIG. 7 is a perspective view of another embodiment of a service panel of the subsurface pesticide injection and fluid extraction system of the present invention.

FIG. 7 illustrates another embodiment of a connector assembly 50 shown mounted to an exterior wall 52 of a structure. Like the connector assembly 28, the connector assembly 50 includes a plurality of nonporous tubular conduits 53. Each nonporous tubular conduit 53 of the connector assembly 50 is provided with a male connector member 54 rather than a female connector member as with the connector assembly 28. The male connector members 54 are shown to extend from the wall 52 and to be supported by a support plate 56.

Each male connector 54 is adapted to receive a source of pressurized pesticide whereby the pesticide may be selectively injected into the fill material 20 in a injection mode via the porous conduits 26 to form a chemical barrier against the infestation of pests into the structure through the openings 25 of the concrete slab 22. A source of pressurized pesticide may be attached to each of the male connector members 54, whereby pesticide is simultaneously injected into both ends of the porous conduit 26, or to only one of the access ports 44. If the source of pressurized pesticide is connected to only one of the access ports 44, the other access port 44 is preferably plugged with a cap 58 or other suitable device.

In a like manner, each male connector 54 is also adapted to be detachably connected to a vacuum source whereby fluids may be selectively extracted from the fill material 20 in an extraction mode to reduce the passage of fluids into the structure through the openings 25 of the concrete slab 22.

Like the access box 42 of the connector assembly 28, the male connector members 54 can also be located in any other convenient location such as on a wall of a garage or in a utility closet.

Figure 8:
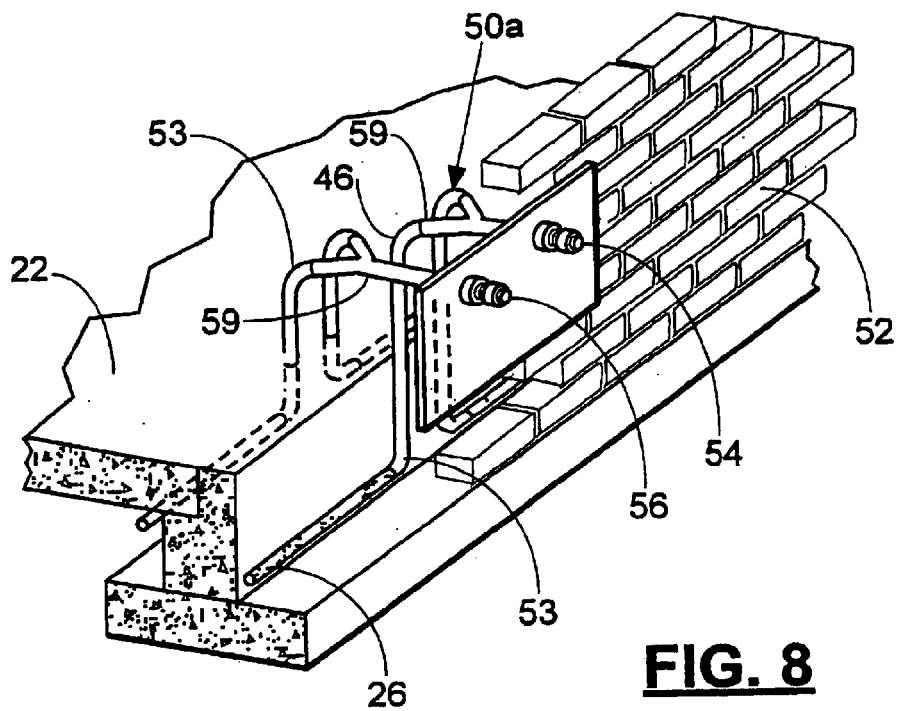
FIG. 8 is a perspective view of yet another embodiment of a service panel of the subsurface pesticide injection and fluid extraction system of the present invention.

FIG. 8 illustrates a connector assembly 50a which is similar to the connector assembly 50 described above with the exception that a Y-connector 59 is attached to the ends of each corresponding nonporous tubular conduit 53 to provide a single point of injection and evacuation for each circuit. Injection of pesticide and evacuation of fluids is made via the male connectors 54. Use of the Y-connector 59 permits pesticide to be simultaneously injected through both ends of the porous conduit 26 in the injection mode and fluids to be simultaneously withdrawn from both ends of the porous conduit 26 in the evacuation mode. Particularly with respect to the injection mode, it has been found that the amount of time required to inject a selected volume of pesticide into the fill material 20 by simultaneously injecting the pesticide through both ends of the porous conduit is decreased more than 60%. For example, the amount of time to inject a pesticide into a fill material using a 500 foot length of porous conduit was decreased from approximately eight minutes when injecting the pesticide into only one end of the porous conduit to approximately three minutes when simultaneously injecting pesticide into both ends of the 500 foot length of porous conduit.

Figure 9:
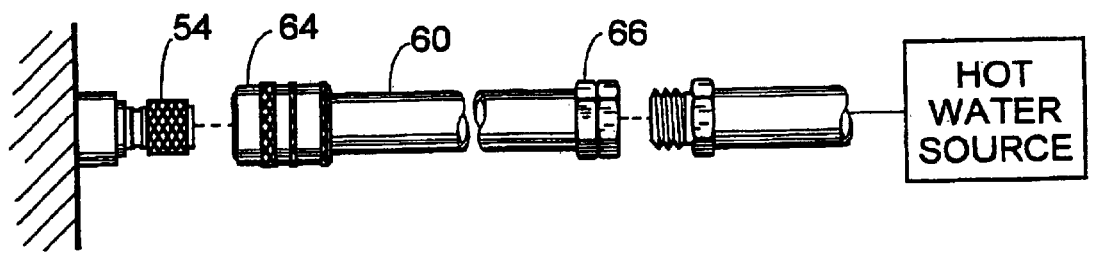
FIG. 9 is a side elevational view of a hose adaptor for permitting the injection of hot water beneath the slab.

Referring now to FIG. 9, an adapter hose 60 suitable for use in injecting a source of pressurized pesticide 62 in the injection mode is shown. The pesticide is illustrated in FIG. 9 as being hot water which is known to control certain pests. A preferred temperature range for the water is from about 90 degrees Fahrenheit to about 180 degrees Fahrenheit. However, water temperatures as low as about 60 degrees may be effective in controlling certain types of pests.

One end of the adapter hose 60 is provided with a female connector member 64 which is adapted to be attached to and detached from the male connector member 54 quickly and easily. The other end of the adapter hose 60 is provided with a connector member 66 which is adapted to be connected to the source of pressurized pesticide 62.

Figure 10:
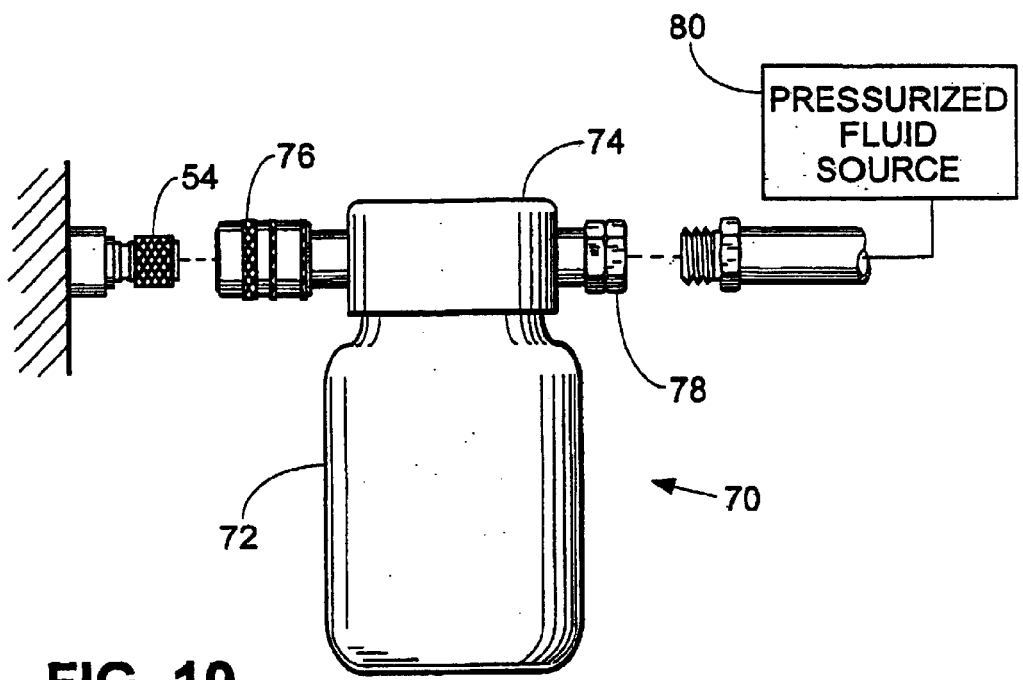
FIG. 10 is a side elevational view of a pesticide injection assembly for permitting the injection of pesticide beneath the slab.

FIG. 10 illustrates a pesticide injection device 70 suitable for use in delivering a liquid pesticide, such as a termiticide, in the injection mode. The pesticide injection device 70 includes a reservoir 72 for holding an amount of liquid pesticide and a siphoning device 74 capable of mixing a metered amount of the liquid pesticide with a selected volume of pressurized fluid. The siphoning device 74 is provided with a female connector member 76 which is adapted to be attached to and detached from the male connector member 54 quickly and easily. The other end of the siphoning device 74 is provided with a connector member 78 which is adapted to be connected to a source of pressurized fluid 80.

The amount of pressure required to effectively inject the pesticide into the fill material 20 and into the base soil 16 will vary depending on the density of the fill material 20 and the base soil 16. However, a pressure range of from about 2 psi to about 80 psi is generally suitable.

Figure 11:
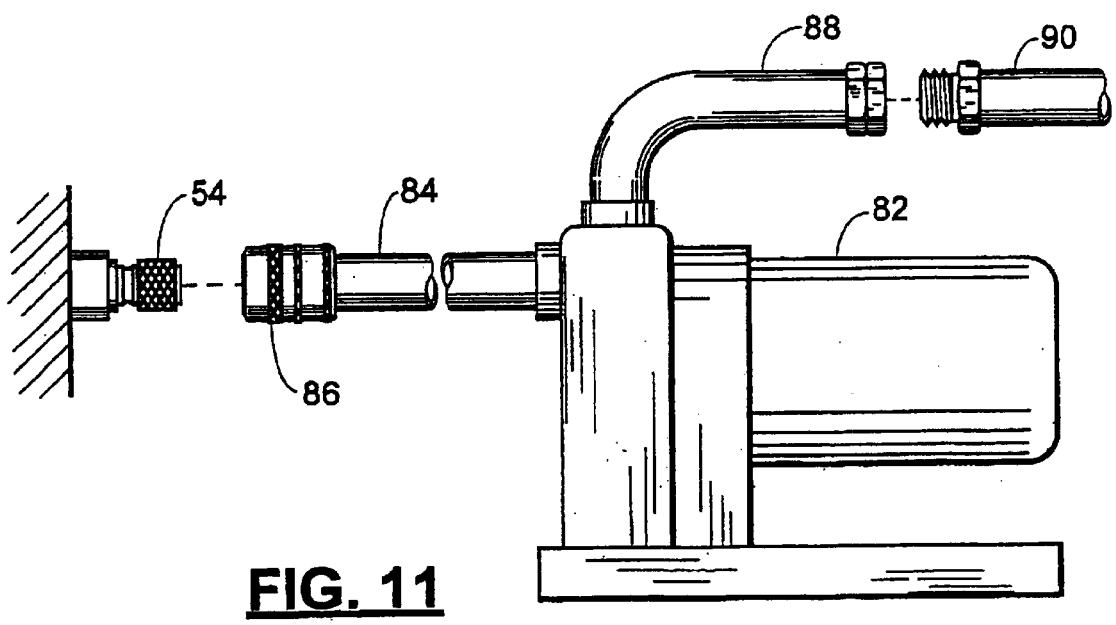
FIG. 11 is a side elevational view illustrating a vacuum pump for permitting the extraction of fluids from beneath the slab.

FIG. 11 illustrates a pump 82 suitable for creating a vacuum in the porous tubular conduits 26 and 26a whereby fluid may be selectively extracted from beneath the foundation 12 of the structure in the extraction mode to reduce the passage of fluids into the structure. The pump 82 has an intake line 84 with a female connector member 86 which is adapted to be attached to and detached from the male connector member 54 quickly and easily. The pump 82 also includes an exhaust line 88 which is adapted to be connected to an extension hose 90 for exhausting the fluids to the exterior of the structure.

Figure 12:
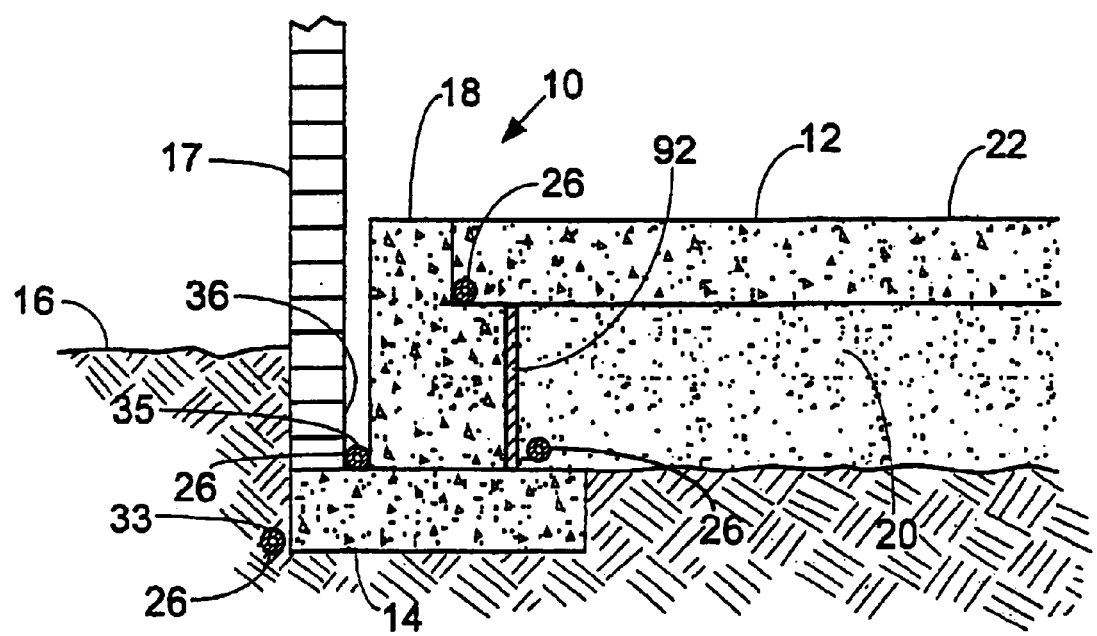
FIG. 12 is a cross-sectional view of a portion of the foundation illustrating alternative embodiments of the subsurface pesticide injection and fluid extraction system of FIG. 1.

FIG. 12 illustrates alternative locations for placement of the tubular conduit, such as tubular conduit 26. In one instance, it may be desirable to place the tubular conduit 26 in the lower portion of the fill material 20, as opposed to the upper portion of the fill material 20. More specifically, the tubular conduit 26 can be positioned along the lower end of an insulation material 92 fixed to the interior side of the stem wall 18 to prevent pests from migrating between the insulation material 92 and the stem wall 18. In another instance, it may be desirable to place the tubular conduit 26 at the perimeter of the stem wall 18 such that the tubular conduit 26 is positioned in the concrete slab 22 so as to be in the path of where cracks are likely to form between the stem wall 18 and the concrete slab 22. Prior to forming the concrete slab 22, the tubular conduit may be secured to the stem wall 18 with a suitable adhesive.

From the above description it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed is:

1. A subsurface pesticide injection system in combination with a structure having a foundation, the subsurface pesticide injection system comprising:

a tubular conduit disposed adjacent the foundation of the structure, the tubular conduit having a sidewall and a plurality of tortuous pores extending through the sidewall of the tubular conduit, the tubular conduit connectable to a source of pesticide to permit pesticide to be selectively introduced into the tubular conduit, the tubular conduit constructed of an elastomeric material such that the introduction of pesticide into the tubular conduit causes the tortuous pores of the tubular conduit to open and release pesticide from the tubular conduit adjacent the foundation of the structure.

2. A subsurface pesticide injection system in combination with a structure having a foundation which defines a perimeter of the structure, the subsurface pesticide injection system comprising:

a tubular conduit disposed on an interior side of the foundation of the structure, the tubular conduit having a sidewall and a plurality of tortuous pores extending through the sidewall of the tubular conduit, the tubular conduit connectable to a source of pesticide to permit pesticide to be selectively introduced into the tubular conduit, the tubular conduit constructed of an elastomeric material such that the introduction of pesticide into the tubular conduit causes the tortuous pores of the tubular conduit to open and release pesticide from the tubular conduit on the interior side of the foundation of the structure.

3. A subsurface pesticide injection system in combination with a structure having a foundation formed in a base soil, the subsurface pesticide injection system comprising:

a tubular conduit disposed within the base soil adjacent an exterior side of the foundation, the tubular conduit having a sidewall and a plurality of tortuous pores extending through the sidewall of the tubular conduit, the tubular conduit connectable to a source of pesticide to permit pesticide to be selectively introduced into the tubular conduit, the tubular conduit constructed of an elastomeric material such that the introduction of pesticide into the tubular conduit causes the tortuous pores of the tubular conduit to open and release pesticide from the tubular conduit into the base soil on the exterior side of the foundation of the structure.

4. A pesticide injection system in combination with a structure, the structure having an exterior facing, the pesticide injection system comprising:

a tubular conduit disposed adjacent an interior side of the exterior facing of the structure, the tubular conduit having a sidewall and a plurality of tortuous pores extending through the sidewall of the tubular conduit, the tubular conduit connectable to a source of pesticide to permit pesticide to be selectively introduced into the tubular conduit, the tubular conduit constructed of an elastomeric material such that the introduction of pesticide into the tubular conduit causes the tortuous pores of the tubular conduit to open and release pesticide from the tubular conduit adjacent the interior side of the exterior facing of the structure.

* * * * *